US010279399B2

(12) United States Patent
Heinloth et al.

(10) Patent No.: US 10,279,399 B2
(45) Date of Patent: May 7, 2019

(54) MILLING TOOL AND CUTTING INSERT FOR SUCH A MILLING TOOL

(71) Applicant: Kennametal Inc., Latrobe, PA (US)

(72) Inventors: Markus Heinloth, Postbauer-Heng (DE); Jan Gruenler, Königshofen a. d. Heide (DE); Hans Woerner, Cadolzburg (DE)

(73) Assignee: KENNAMETAL INC, Latrobe, PA (US)

( * ) Notice: Subject to any disclaimer, the term of this patent is extended or adjusted under 35 U.S.C. 154(b) by 319 days.

(21) Appl. No.: 15/018,924

(22) Filed: Feb. 9, 2016

(65) Prior Publication Data
US 2016/0236286 A1 Aug. 18, 2016

(30) Foreign Application Priority Data

Feb. 12, 2015 (DE) .......................... 10 2015 102 044

(51) Int. Cl.
B23C 5/08 (2006.01)
B23C 3/08 (2006.01)
B23C 5/22 (2006.01)

(52) U.S. Cl.
CPC .............. B23C 5/08 (2013.01); B23C 5/2234 (2013.01); B23C 2200/0433 (2013.01); B23C 2210/287 (2013.01); B23C 2210/325 (2013.01); B23C 2215/16 (2013.01); B23C 2215/20 (2013.01); B23C 2220/605 (2013.01)

(58) Field of Classification Search
CPC . B23C 2200/0433; B23C 3/06; B23C 5/2234; B23C 2215/16; B23C 2215/20; B23C 5/2221; B23C 2200/081; B23C 2200/125; B23C 2210/287; B23C 2210/325
See application file for complete search history.

(56) References Cited

U.S. PATENT DOCUMENTS 4,740,115 A    4/1988  Hertel et al.
5,004,378 A *  4/1991  Arai .................... B23B 27/1662
                                                    407/101
(Continued)

FOREIGN PATENT DOCUMENTS

CN        1816409 A     8/2006
CN      101495261 A     7/2009
(Continued)

OTHER PUBLICATIONS

Aug. 21, 2018 Foreign OA.

Primary Examiner — Sara Addisu
(74) Attorney, Agent, or Firm — Matthew S. Bedsole

(57) ABSTRACT

A milling tool with a disk- or strip-shaped base body, which can be driven around an axis of rotation, and several cutting inserts arranged along the outer circumference of the base body on opposite sides from one another, wherein the cutting inserts, viewed in the axial direction, overlap one another. The invention also relates to a tangential cutting insert for a milling tool of the above-mentioned type, with two side surfaces, through which a fastening opening extends, and two face ends, wherein cutting edges are formed at the junction of the front faces to the side surfaces, wherein the fastening opening is positioned eccentrically.

5 Claims, 5 Drawing Sheets

(56) References Cited

U.S. PATENT DOCUMENTS

| | | | | |
|---|---|---|---|---|
| 5,314,269 | A * | 5/1994 | Arai | B23C 5/2221 407/113 |
| 5,454,671 | A * | 10/1995 | Qvarth | B23C 5/202 407/113 |
| 5,893,401 | A * | 4/1999 | Eriksson | B27L 1/08 144/208.8 |
| 6,068,430 | A | 5/2000 | Saeki et al. | |
| 6,374,472 | B1 * | 4/2002 | Ramold | B23C 3/06 29/27 R |
| 6,764,254 | B2 * | 7/2004 | Emoto | B23C 5/08 407/113 |
| 6,939,091 | B2 * | 9/2005 | Wermeister | B23C 5/08 407/103 |
| 8,317,435 | B2 * | 11/2012 | Heinloth | B23C 5/207 407/113 |
| 8,500,375 | B2 * | 8/2013 | Heinloth | B23B 5/18 407/113 |
| 8,858,132 | B2 * | 10/2014 | Heinloth | B23C 3/06 407/115 |
| 2003/0215294 | A1 * | 11/2003 | Wermeister | B23C 5/08 407/113 |
| 2006/0165501 | A1 * | 7/2006 | Heinloth | B23C 5/08 409/199 |
| 2008/0240871 | A1 * | 10/2008 | Bar | B23C 5/08 407/35 |
| 2009/0052997 | A1 * | 2/2009 | Shimizu | B23C 3/06 407/34 |
| 2011/0058907 | A1 * | 3/2011 | De Souza Filho | B23C 5/2221 407/40 |
| 2011/0076106 | A1 * | 3/2011 | Morrison | B23C 5/1045 407/102 |
| 2012/0070238 | A1 * | 3/2012 | Men | B23C 5/1045 407/42 |
| 2012/0269588 | A1 * | 10/2012 | Kaufmann | B23B 27/04 407/47 |
| 2014/0227048 | A1 * | 8/2014 | Heinloth | B23C 5/12 407/51 |
| 2015/0117970 | A1 * | 4/2015 | Daub | B23C 5/06 407/42 |
| 2016/0059333 | A1 * | 3/2016 | Thornqvist | B23C 5/08 407/29 |
| 2017/0014920 | A1 * | 1/2017 | Fang | B23C 5/2221 |
| 2017/0216937 | A1 * | 8/2017 | Stark | B23C 5/109 |

FOREIGN PATENT DOCUMENTS

| | | |
|---|---|---|
| CN | 103658799 A | 3/2014 |
| WO | 2013144030 | 10/2013 |

* cited by examiner

MILLING TOOL AND CUTTING INSERT FOR SUCH A MILLING TOOL

CLAIM TO PRIORITY

This application is a National entry application of German Application No. 102015102044.0, filed on Feb. 12, 2015, the entire contents of which is incorporated herein by reference.

FIELD OF THE INVENTION

The invention relates to a milling tool with a disc- or strip-shaped base piece that can be driven around an axis of rotation and several cutting inserts disposed on opposite sides along the outer circumference of the base piece. The invention also relates to a tangential cutting insert, especially for a milling tool of this type, with two side surfaces through which a fastening opening extends, and two face ends, wherein cutting edges are formed at the junction of the front faces to the side surfaces.

The milling tool can especially be a rotary broaching tool or a rotational rotary working tool, for example those that are used as crankshaft milling tools or camshaft milling tools, thus a milling tool with which surfaces on crankshafts or camshafts for internal combustion engines can be machined.

BACKGROUND OF THE INVENTION

A milling tool of the type mentioned above is known from DE 102 38 451 A1. A brief explanation based on FIGS. 1 and 2 is provided below.

The milling tool has a base body 5 that is rotatably mounted in a machine tool around a rotating shaft. To the support 5, several holders 7 are fastened, which together form a disk-like structure. Several base bodies 10 are attached along the external circumference of the holder 7, which together form the external perimeter of the milling tool.

In the embodiment shown in FIG. 1, each base body is strip-shaped, thus extends over a certain portion of the perimeter of the milling tool and has a thickness, measured in the radial direction, that is a fraction of the diameter of the milling tool. Alternatively, it is also possible for the support and the holder to be omitted, so that a larger, disc-shaped base body is used.

In this case, several cutting inserts 12 are attached to the base body 10 (see FIG. 2). These are tangential cutting inserts, which are mounted by means of a fastening screw 14.

In the exemplary embodiment shown in FIG. 2, each cutting insert 12 is mounted in a support or a cassette 16, which in turn is mounted on the base body 10 with screws 18. Basically it would also be possible to fasten each cutting insert 12 directly to the base body 10.

As can be seen in FIG. 2, the cutting inserts 12 are arranged along the outer circumference of the base body 10, alternating on opposite sides. This is because only in this way is it possible to fasten the cassettes 16 onto the base body.

The arrangement of the axial components of the cutting forces acting on the cutting inserts 12 on the base body 10 during cutting is schematically illustrated in FIG. 3. Based on the alternating arrangement of the cutting inserts 12, the axial forces $F_a$ act alternately in opposite directions. The arrangement of the axial forces $F_a$ potentially causes flexural stresses on the base body 10.

The opposing forces naturally act on the workpiece during cutting. Thus different axial forces act on the workpiece during each passage of a cutting insert 12.

Both the flexural stresses of the base body 10 and the alternating axial forces that act on the workpiece potentially result in tolerances during milling.

SUMMARY OF THE INVENTION

The object of the invention is to create a milling tool and a cutting insert with which narrower tolerances can be maintained during cutting.

To solve this problem, in a milling tool of the type described above, it is provided that the cutting inserts, viewed in the axial direction, overlap one another. To solve this problem, in a milling tool of the type initially described, it is further provided that the fastening opening is configured eccentrically. The invention is based on the underlying concept of configuring the cutting inserts such that insofar as possible they operate simultaneously and thus in pairs. In this way, they balance out one another's axially aligned components of the cutting force, so that (assuming that cutting inserts are located exactly opposite one another) no flexural forces whatsoever act on the base body or (assuming a slight offset in the peripheral direction) the effective arm of force between the components of the cutting force acting in the axial direction is distinctly lower than in the prior art. The paired positioning of the cutting inserts is made possible by the fact that their fastening openings are arranged eccentrically, so that, in a pair of cutting inserts arranged opposite one another, the fastening screw that is screwed in from one side (based on the direction of rotation) is located "toward the front," whereas the fastening screw that is screwed in from the other side is located "toward the rear." Thus, enough material is available in the base body between the two fastening screws to receive the fastening screws. The eccentric arrangement of the fastening opening on the cutting insert is diametrically opposed to the former approach in which the fastening opening was arranged centrally in regard to the indexability of the cutting insert.

According to a preferred embodiment of the invention, it is provided that the overlap amounts to at least 50% of the width of a cutting insert measured in the peripheral direction. While an overlap basically already results in a decrease in the tolerances that occur during machining with the milling tool according to the invention, the degree of overlap increases the accuracy of the machining and reduces the alternating stressing of the workpiece and the flexural stressing of the base body.

It is particularly preferred that the overlap amounts to at least 80% of the width of a cutting insert measured in the peripheral direction. As a result, the tolerances that occur are further reduced.

It is even more preferred if the overlap amounts to at least 90% of the width of a cutting insert measured in the peripheral direction. The flexural stresses on the base body resulting from the axial components of the cutting forces that are staggered relative to one another are negligible, since the effective lever arm is negligible relative to the rigidity of the base body.

According to one embodiment of the invention, the cutting inserts on the side surfaces of the base body are of different types. This makes it possible to optimally adapt the cutting performance of the milling tool to the respective requirements. For example, the cutting inserts on the side surfaces of the base body may be rough cutting inserts and finish cutting inserts.

According to a preferred embodiment, cutting inserts of a third type are arranged on the peripheral surfaces of the base body. Using these, additional surfaces can be machined in the same work pass, for example the cylindrical surface of a crankpin.

According to one embodiment of the invention, it is provided that the cutting inserts are tangential inserts. Such cutting inserts are generally known and are well suited for use in a crankpin cutter.

It is preferably provided that the fastening opening does not intersect or only slightly intersects a center plane of the cutting insert that extends parallel to the front faces. In this way, it is possible to ensure that the distance between the two fastening screws of a pair of laterally arranged cutting inserts, measured in the peripheral direction, is large enough.

According to one variant of the invention, the lateral surfaces are staggered relative to one another in a direction parallel to the direction of extension of the side surfaces. Such asymmetric cutting inserts are well suited as indexable inserts for machining crankshafts.

The front faces of the cutting inserts, which are arranged on the side surfaces of the base body, can be optimally implemented relative to the surfaces to be machined. For example, the front faces can have a parallelogram-like shape or a rectangular shape with a projecting bead.

BRIEF DESCRIPTION OF THE DRAWINGS

The invention is explained below with reference to two embodiments illustrated in the accompanying drawings. In the drawings.

DETAILED DESCRIPTION OF THE INVENTION

Figure 4:
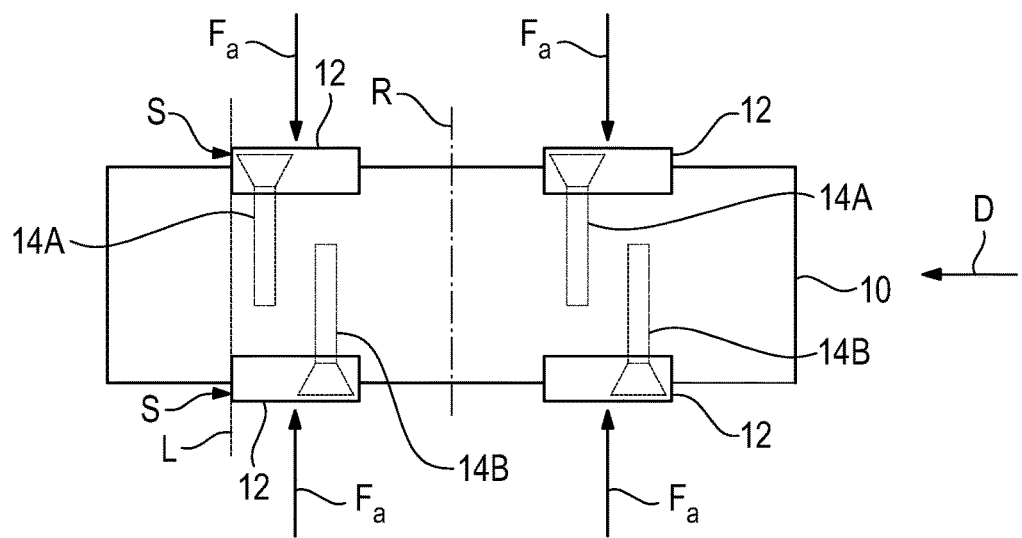
FIG. 4 shows a schematic view of a base body according to the invention.

In FIG. 4, a base body 10 for a milling tool according to the invention is shown schematically. The essential difference from the milling tool of the prior art is the fact that the cutting inserts 12, which are arranged on opposite sides of the base body 10, overlap one another, specifically, viewed in the axial direction along the axis of rotation. Expressed in another way: The cutting inserts 12 are arranged in pairs in such a manner that the offset between the two cutting edges of the cutting insert 12 of a pair, measured in the peripheral direction, is smaller than the length of the cutting inserts measured in the peripheral direction.

In the basic principle of the base body 10 according to the invention shown in FIG. 4, the cutting edges S located toward the front in the direction of rotation D lie on the same line, indicated here by L.

Figure 1:
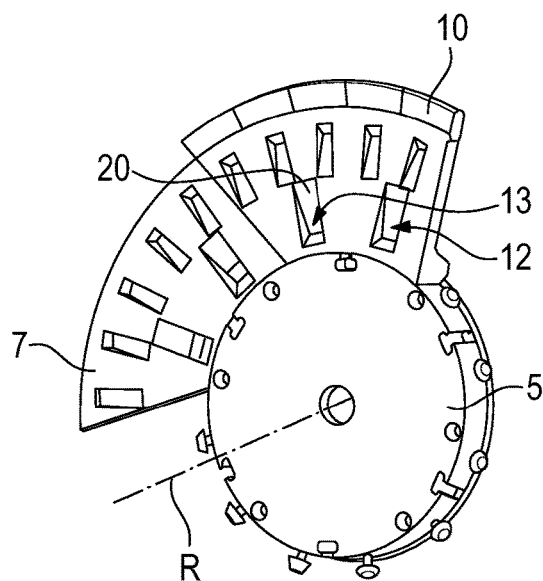
FIG. 1 shows a schematic view of a milling tool of the prior art.
Figure 2:
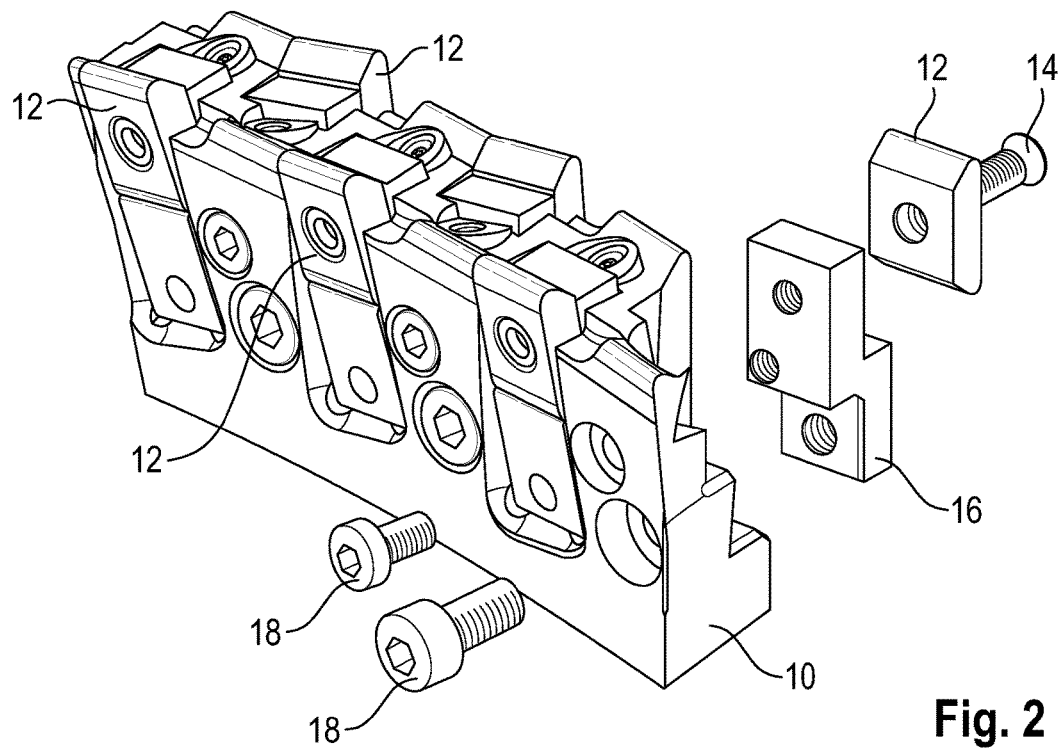
FIG. 2 shows a base body used in the milling tool of FIG. 1 with cutting inserts attached.
Figure 3:
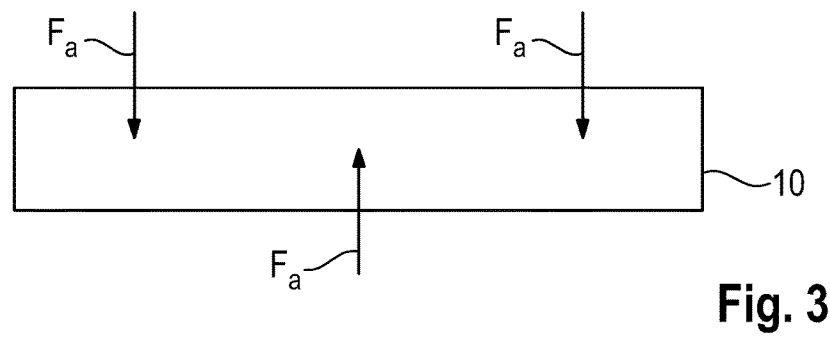
FIG. 3 shows a schematic view of the axial forces acting on the base body 10 during milling.

The consequence of the paired arrangement of the cutting inserts 12 on opposite sides of the base body 10 is that the axial components $F_a$ of the cutting forces are not offset relative to one another, as is shown in FIG. 3, but are opposite one another. Thus, there is no lever arm between the effective axial components of the cutting force, and no flexural stresses result on the base body 10.

Although in the basic principle shown in FIG. 4 the cutting inserts completely overlap one another, it is fundamentally possible to position the cutting inserts 12 slightly offset relative to one another. It is obvious that, the larger the overlap, the smaller the flexural forces acting on the base body 10. It is particularly preferred that the overlap amounts to at least 50% of the width of a cutting insert measured in the peripheral direction. It is particularly preferred that the overlap amount to at least 80%, and especially advantageous if the overlap amounts to at least 90% of the width of a cutting insert measured in the peripheral direction.

The cutting inserts 12 can be arranged to overlap one another in pairs, since they are provided with a fastening opening 20 that is arranged eccentrically. This results in the fact that the fastening screws 14 are also arranged eccentrically and are thus offset relative to one another. It is apparent from FIG. 4 that each of the cutting inserts arranged on the side surface of the base body 10 located at the top in FIG. 4 is attached to the base body with a fastening screw 14A, which, when viewed in the peripheral direction or direction of rotation D, lies in front of the fastening screws 14B, with which the cutting inserts 12 are attached to the base body 10, which are fastened to the side surface of the base body 10 located at the bottom in FIG. 4.

A first embodiment of the invention will now be described based on FIGS. 5 to 9.

Figure 5:
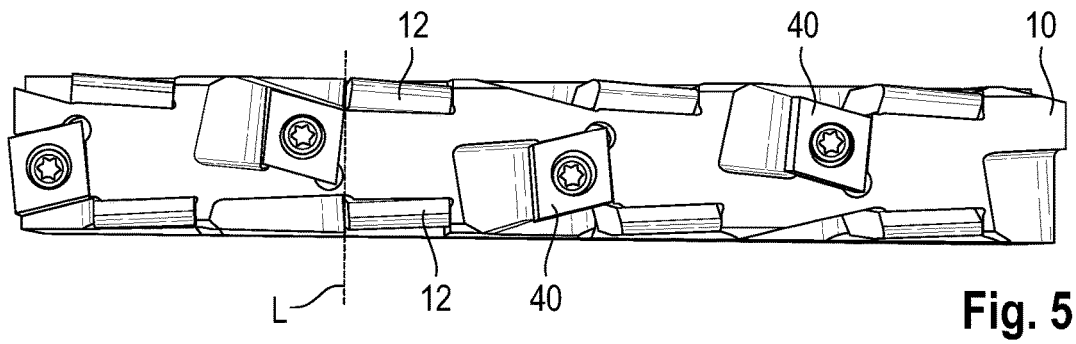
FIG. 5 shows a top view of a base body according to a first embodiment of the invention.

In the base body 10 according to the first embodiment, the cutting inserts 12 are attached in pairs in such a manner that they completely overlap one another (see line L drawn in FIG. 5).

Figure 6:
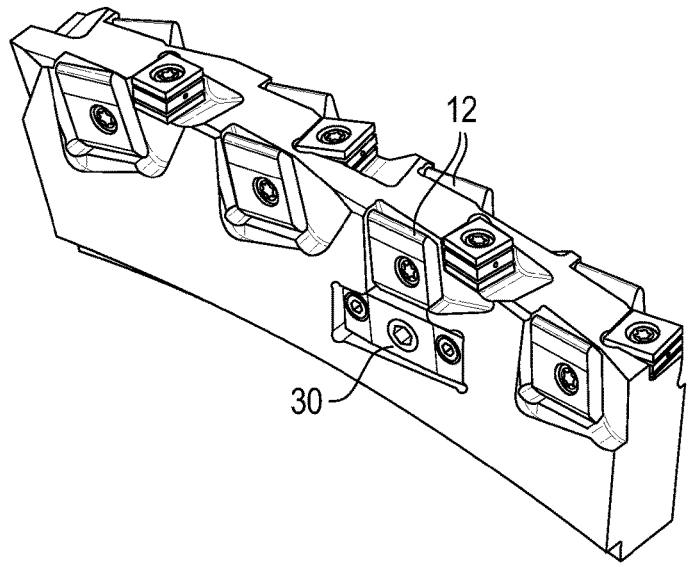
FIG. 6 shows a perspective view of the base body of FIG. 5.
Figure 7:
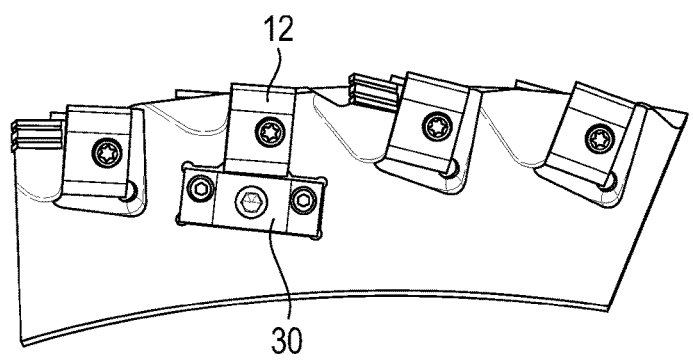
FIG. 7 shows a side view of the base body of FIG. 5.
Figure 8:
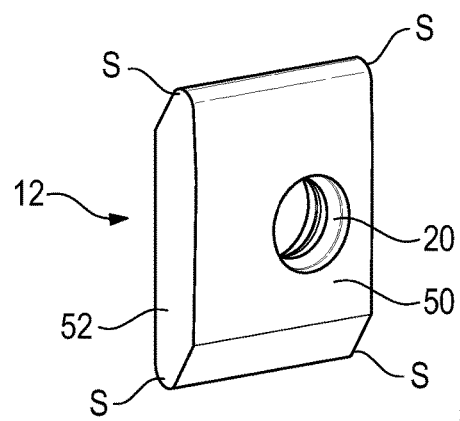
FIG. 8 shows a perspective view of a cutting insert used in the first embodiment.

As can be seen in FIGS. 6 and 7, a few cutting inserts 12 have an adjustment device 30 assigned to them with which these cutting inserts can be aligned.

It is basically also possible to mount the cutting inserts 12 in their own cassettes, which are then, in turn, attached to the base body 10 with eccentrically positioned fastening screws.

It can also be seen in FIGS. 5 to 7 that additional cutting inserts 40 are attached in a staggered arrangement on the peripheral surface of the base body 10.

The cutting inserts 12 arranged on the side surfaces are tangential cutting inserts, each with two side surfaces 50, through which the fastening opening 20 extends. In addition, each cutting insert 12 has two front faces 52, which in the embodiment shown here, have the shape of a parallelogram in the broadest sense of the word. The cutting edges S are formed at the junction between the front faces 52 and the side surfaces 50.

Figure 9:
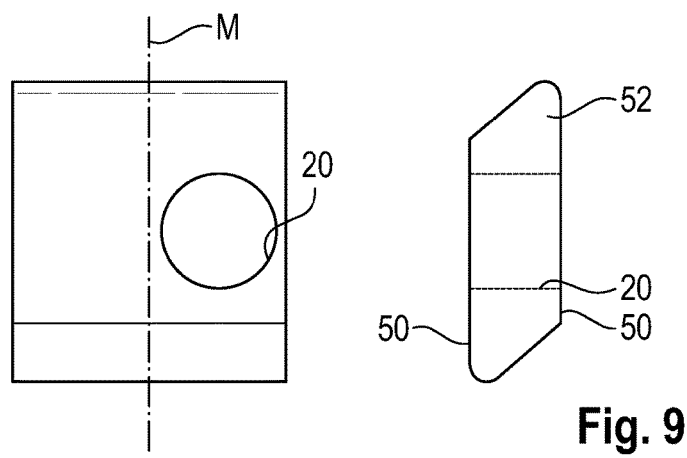
FIG. 9 shows a side view of the base body of FIG. 8.

As can be seen in FIG. 9 in particular, the fastening opening 20 is arranged eccentrically. In this case, in the embodiment shown, it is arranged such that it is just tangential to a middle plane M of the cutting insert.

Depending on the edge design requirements in any given case, it may also be provided that the fastening opening 20 slightly intersects the center plane M. "Slightly" here is assumed to mean an overlap amounting to no more than 20% of the diameter of the fastening opening 20.

Figure 10:
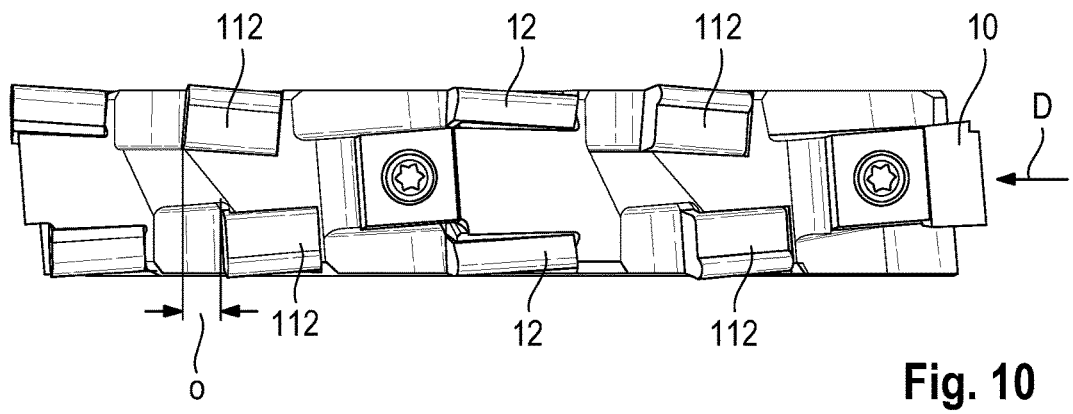
FIG. 10 shows a top view of a base body according to a second embodiment.

In FIG. 10, a base body for a milling tool according to a second embodiment is shown. Here, elements familiar from the first embodiment are given the same reference numbers, and therefore reference is made to the above explanations.

Figure 11:
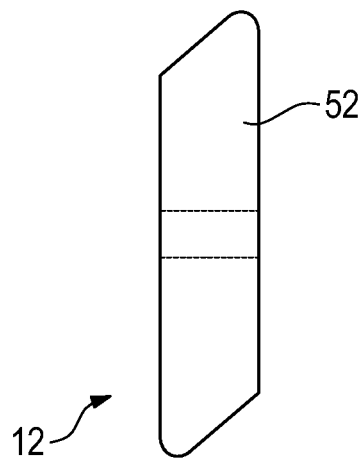
FIG. 11 shows a top view of a cutting insert according to a first variant.
Figure 12:
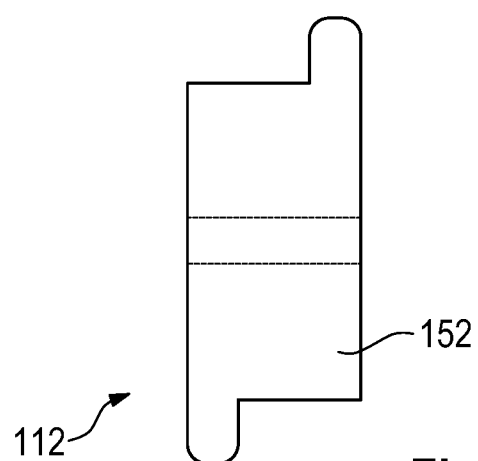
FIG. 12 shows a top view of a cutting insert according to a first variant.

The essential difference between the first and second embodiments consists of the fact that, in the second embodiment, two types of cutting inserts 12 are used on the side surfaces of the base body 10, namely the cutting inserts known from the first embodiment with parallelogram-shaped front faces 52 (also see FIG. 11) and cutting inserts 112, the front faces 152 of which (see FIG. 12) have a generally rectangular shape with a projecting bead at diagonally opposite corners.

The cutting inserts 112 can be rough cutting inserts, and the cutting inserts 12 be finishing-rough cutting inserts.

As can be seen in FIG. 10, the rough cutting inserts 112, viewed in the peripheral direction or the direction of rotation D, are offset relative to one another (see offset o). Nevertheless, they overlap when viewed in the axial direction.

What is claimed is:

1. A tangential cutting insert for a milling tool comprising two side surfaces, through which a fastening opening extends, and two front faces, wherein cutting edges are formed at the junction of the front faces with the side surfaces, wherein the fastening opening is eccentric with respect to a middle plane, M, of the cutting insert.

2. The cutting insert according to claim 1, wherein the fastening opening does not intersect the middle plane, M, of the cutting insert or intersects the middle plane, M, of the cutting insert by no more than 20% of a diameter of the fastening opening.

3. The cutting insert according to claim 1, wherein the front faces have a parallelogram shape.

4. The cutting insert according to claim 1, wherein the front faces have a rectangular shape with a projecting bead.

5. The cutting insert according to claim 1, wherein the middle plane, M, extends parallel to the front faces.

* * * * *